July 14, 1959 W. V. KUCHAN 2,895,013

AUTOMATIC TELEPHONE SYSTEM AND ELECTRO-MAGNETIC ACTUATING MECHANISM THEREFOR

Filed April 3, 1956 5 Sheets-Sheet 1

Inventor:
Walter V. Kuchan.
By. Stice & Stice Attys.

July 14, 1959

W. V. KUCHAN 2,895,013

AUTOMATIC TELEPHONE SYSTEM AND ELECTRO-MAGNETIC ACTUATING MECHANISM THEREFOR

Filed April 3, 1956

5 Sheets-Sheet 2

Inventor:
Walter V. Kuchan.
By: Stice & Stice Attys.

July 14, 1959 W. V. KUCHAN 2,895,013

AUTOMATIC TELEPHONE SYSTEM AND ELECTRO-MAGNETIC ACTUATING MECHANISM THEREFOR

Filed April 3, 1956 5 Sheets-Sheet 3

Inventor.
Walter V. Kuchan,

By. S Lee & S Lee Attys.

July 14, 1959 W. V. KUCHAN 2,895,013

AUTOMATIC TELEPHONE SYSTEM AND ELECTRO-MAGNETIC ACTUATING MECHANISM THEREFOR

Filed April 3, 1956 5 Sheets-Sheet 4

Inventor:
Walter V. Kuchan
By: Lee & Lee Attys.

Inventor:
Walter V. Kuchan.
By S. Lee & S. Lee Attys.

United States Patent Office 2,895,013

Patented July 14, 1959

2,895,013

AUTOMATIC TELEPHONE SYSTEM AND ELECTROMAGNETIC ACTUATING MECHANISM THEREFOR

Walter V. Kuchan, Eureka, Mont.

Application April 3, 1956, Serial No. 575,788

14 Claims. (Cl. 179—27.54)

The invention relates generally to actuating and switching mechanism and automatic telephone systems utilizing the same, and more particularly to an actuating mechanism for multiple switches and associated telephone circuits and the like.

The invention has among its objects the production of an actuating mechanism for actuating any one of a plurality of devices, as for example, switches, which mechanism is exceedingly simple in construction, having a minimum of moving parts and which is very efficient for the purposes intended.

Another object of the invention is the production of such a mechanism in which the motivating structure may embody only a single electromagnetic circuit and in which the selector mechanism may utilize merely two electromagnetic circuits, so that a hundred-element switch structure, for example, may employ only three circuits to operate any desired one of the hundred elements.

A further object of the invention is the production of such an actuating mechanism which is so designed that all movable elements may have comparatively very short movement, eliminating any necessity of one element having numerous successive or cumulative movements.

Another object of the invention is the production of such an actuating mechanism which is of particular application in signal and control circuits as well as automatic telephone circuits for use as a line finder, selector or connector, etc., and which is so proportioned that it may be readily utilized in banks and stacks of similar devices, the overall size of the actuating mechanism being relatively little more than the corresponding size of the switching elements with which it may be associated, thereby providing a structure of minimum bulk and weight.

Another object of the invention is the production of such a mechanism which in one form may readily include means for controlling pulsing and switching operations.

A further object of the invention is the production of such an actuating mechanism which is extremely flexible in design and may utilize various known impulse counter relay structure for actuating and controlling the selector mechanism.

A further object of the invention is the production of a novel automatic telephone system which may embody my novel actuating and switching mechanisms, such system embodying comparatively simple foolproof circuits utilizing a minimum of relays, and at the same time providing desirable operational features.

A further object of the invention is the production of such a system in which the calling and called phone circuits may each be fed by their own batteries and all attachments are removed from the connecting truck during audible transmission and which may therefore be dry or free from battery currents between the originating and terminating bridge circuits.

A further object of the invention is the production of such a system in which the terminating bridge upon answer of the called phone will send an impulse back to the originating bridge to reverse the battery on the calling line for supervisory purposes and which may then remove all unnecessary attachments from the line.

A further object of the invention is the production of a novel phone circuit wherein the called line is tested during the energization period of a busy tone relay, whereby the line, if free, will result in the busy tone relay being rendered inoperative prior to actuation of its contacts, and if the line is busy, such relay will be permitted to close its contacts, placing a busy tone on the calling line and preventing operative connection of the terminating bridge to such line, providing a comparatively simple terminating switch circuit with a minimum of actuating relays.

A further object of the invention is the production of such a phone circuit which by comparatively simple means will impart an audible signal such as dial or busy tone signals on the line of either party in the event the other party hangs up, whereby the remaining party is immediately notified of such fact.

A further object of the invention is the production of a circuit having the above advantages in which one set of relays may do all the pulsing, such relays being automatically connected to successive switching means as each connection is made, and in which the control circuit may be extended forward from an actuated switching mechanism to a subsequent mechanism, all being under the primary control of the originating bridge.

A further object of the invention is the production of such a novel phone circuit in which a two-wire trunk may function to carry pulsing, switching, polarity reversing and disconnect impulses as well as the audible transmission, the trunk at the same time being free from battery currents and thus dry during audible transmission.

A further object of the invention is the production of such a novel phone circuit in which the ringing relay of the terminating brige may be independent of the ringing current, whereby any frequency ringing or tone currents may be readily utilized.

Many other objects and advantages of the construction herein shown and described will be obvious to those skilled in the art from the disclosure herein given.

To this end my invention consists in the novel construction, arrangement and combinaiton of parts herein shown and described, and more particularly pointed out in the claims.

In the drawings, wherein like reference characters indicate like or corresponding parts:

Figure 1:
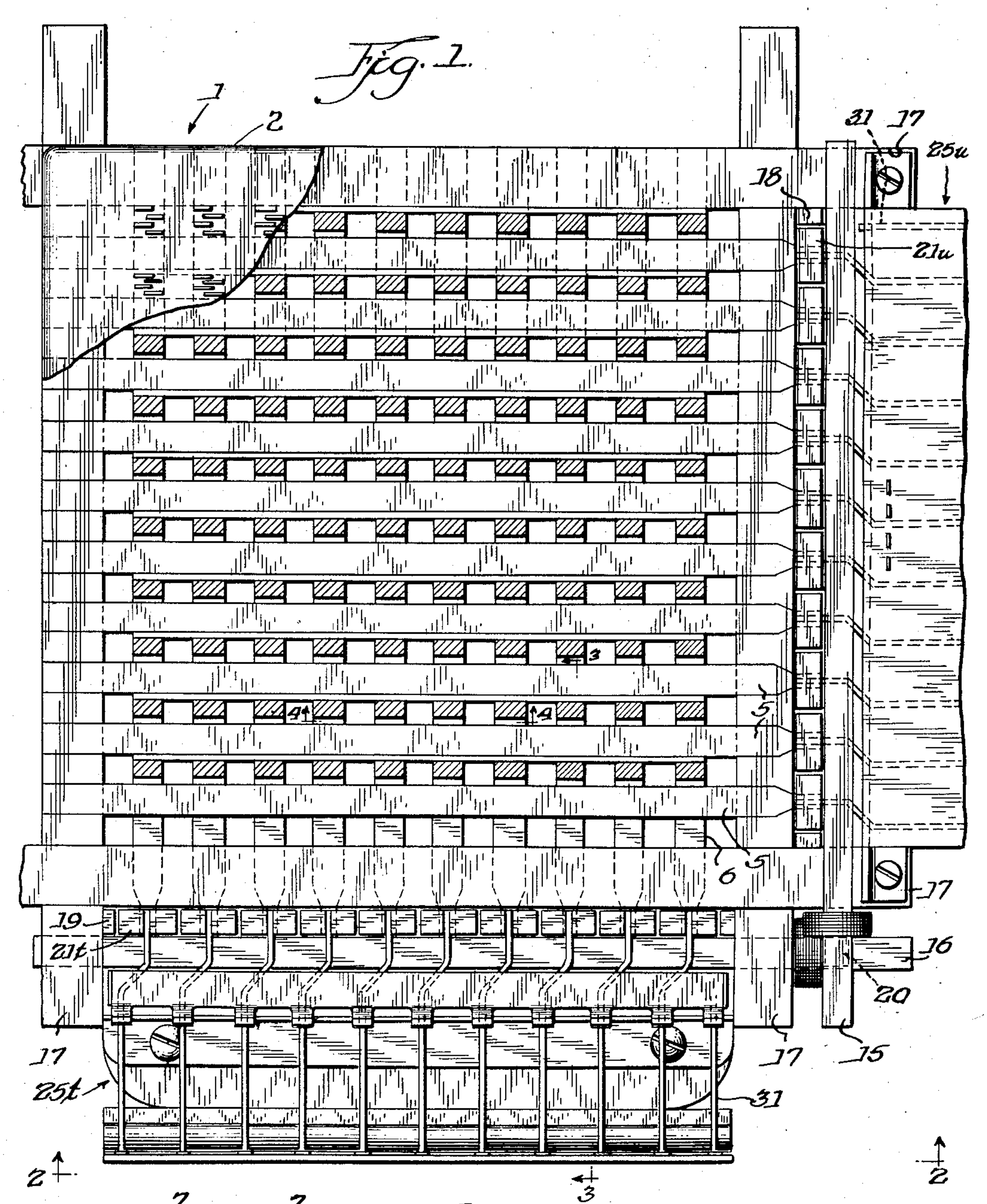
Fig. 1 is a top plan view of an actuating mechanism embodying the present invention, the bulk of the switching assembly being eliminated.
Figure 4:
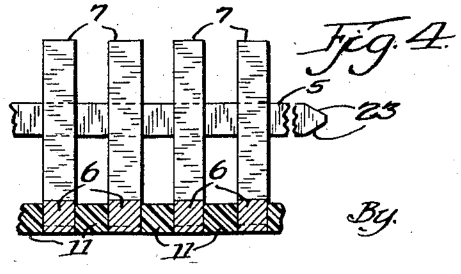
Fig. 4 is a sectional view taken approximately on the line 4—4 of Fig. 1.

The invention, in part, is directed to an actuating mechanism for switches and the like wherein each actuating element or armature is cooperable with a pair of paramagnetic bars, whereby upon magnetization of the bars with opposite magnetic polarity, the armature associated therewith will cooperate with the bars to complete a magnetic circuit, resulting in movement of the armature. Two series of bars may be employed, the bars being positioned in spaced parallel planes with the bars of one series extending in a direction transverse to the direction of the bars of the other series, the armatures being positioned adjacent the points of intersection of the bars if the latter were positioned one on the other whereby each armature may be associated with a respective pair of bars and upon suitable magnetization of one bar from each series, the armature operatively associated with that particular pair of bars will be actuated. The actuating mechanism also includes means for selecting any desired bar of each series whereby any particular armature may be reselected and actuated. The means for completing the magnetic circuit is illustrated as being actuated by impulse counting relays. Various types of impulse counting relays or the like may be utilized with the actuating mechanism shown and described herein, and for purposes of explanation of the invention, the counting mechanism illustrated is similar to that shown and described in Bellamy Patent No. 2,538,816 issued January 23, 1951.

*General actuating and switching mechanism*

Referring to the drawings, and particularly Figs. 1 through 5, the reference numeral 1 indicates a switching mechanism constructed in accordance with the invention, which in the particular form illustrated would be suitable for use as a connector, selector, or line finder, as the case may be, the construction illustrated being adapted to select and actuate any one of one hundred connections.

The structure 1 may be generally divided into two sections, an upper switch carrying section 2 and a lower base structure 3 carrying the actuating mechanism.

Figures 2, 3, 5, 6, 7:
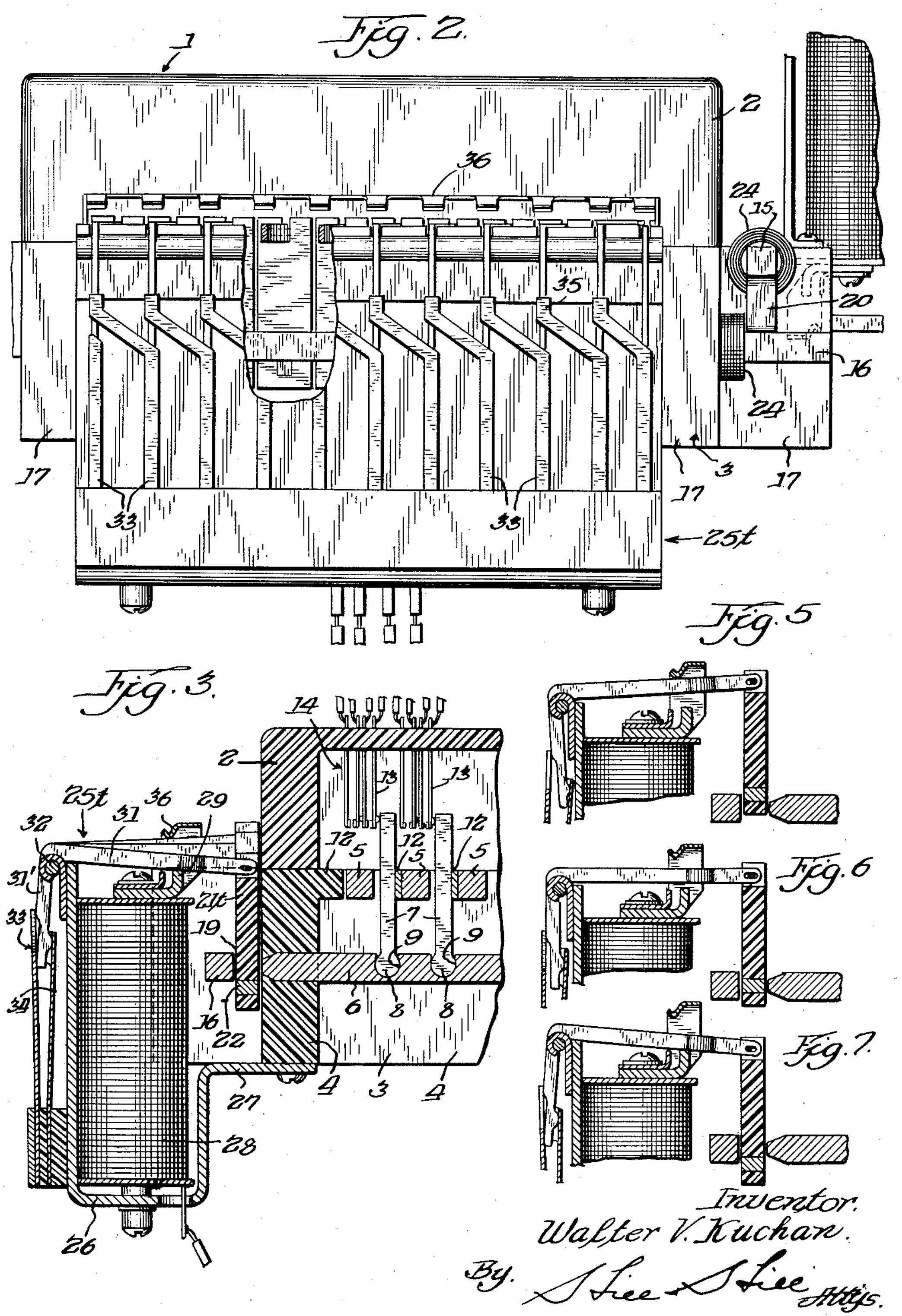
Fig. 2 is an elevational view of the mechanism illustrated in Fig. 1 taken approximately on the line 2—2 of Fig. 1, illustrating details of the impulse counting mechanism.
Fig. 3 is a sectional view taken approximately on the line 3—3 of Fig. 1.
Fig. 5 is a sectional view through the impulse counting mechanism similar to Fig. 3, with an armature thereof illustrated in non-actuated position.
Fig. 6 is a view similar to Fig. 5 with such armature in intermediate or partially actuated position.
Fig. 7 is a view similar to Figs. 5 and 6 with such armature in fully actuated position.

The base 3, as illustrated in Fig. 3, may be of generally annular shape having side walls 4 of generally rectangular cross section and formed from a non-magnetic material such as plastic, aluminum or the like. Carried by the base member 3 are two series of bars 5 and 6, hereinafter referred to for the purposes of identification as "cross bars," both of paramagnetic material, the bars 5 as viewed in Fig. 1 extending horizontally and the bars 6 extending vertically, the respective series of bars lying in spaced parallel planes and rigidly carried by the base structure, if desired being cast or imbedded therein when the latter is fabricated. Associated with the bars 6 is a plurality of armatures 7, the latter or the present embodiment being pivotally supported by the bars 6, such pivotal construction in the embodiment illustrated in Fig. 3 comprising a cylindrical end portion 8 on each armature positioned in a complementary recess 9 in the cooperable bar, the mouths of the recesses 9 opening on the upper face of the bar as viewed in Fig. 3 being less in width than the diameter of the cylindrical portions 8 of the armature, whereby the armature is free to pivot about the axis of the cylindrical portion 8 but cannot be withdrawn upwardly out of such recess. Operative engagement of each armature with its associated bar 6 may be maintained by intermediate non-magnetic members 11 positioned between each pair of bars 6 operative to prevent lateral or axial movement of the portions 8 of the armatures, insuring retention of the latter within their cooperable recess. Similar strips 12 of non-magnetic material positioned adjacent the bars 5 insulate the armatures 7 from one of the adjacent bars 5 and form stops limiting movement of the armatures in one direction, to-wit, clockwise, as viewed in Fig. 3. It will be apparent that as the bars 5 and 6, as well as armatures 7, are made of paramagnetic material, magnetization of one of the bars 6 of one magneic polarity and one of the bars 5 of the opposite magnetic polarity, the single armature 7 adjacent the intersection of the two selected bars which is free to move toward the particular magnetized bar 5 will be strongly attracted to such bar as the armature 7 will carry the same polarity as that of the bar 6 supporting the same, and being opposite to the polarity of the bar 5, a strong magnetic field of attraction between the latter and the armature will be created.

In the embodiment of the invention illustrated in Fig. 3, the armatures 7 are biased in the positions illustrated in Fig. 3 by the resiliency of the adjacent leaf 13 of each switch, indicated generally by the numberal 14, and illustrated in the drawings as comprising two pairs of cooperable contacts, both pairs being illustrated as of normally open type adapted to be closed by movement of the armature 7 associated therewith. As hereinafter described, when utilized in automatic phone circuits, at least three sets of contacts will normally be employed with each switch.

Referring to Fig. 1, it will be noted that the construction illustrated comprises ten of the bars 5 and a like number of bars 6 in combination with one hundred armatures 7, each armature being operatively associated with a different pair of bars 5 and 6. Consequently, any of the one hundred armatures 7 may be actuated by magnetization of the particular pair of bars 5 and 6 associated therewith. If one series of bars is numbered from one to ten, and the other series of bars are numbered by tens, to-wit, ten, twenty, thirty, forty, fifty, etc., the armatures may each be identified by a respective number from one to one hundred. As will be apparent to those skilled in the art, the base 3 may, if desired, be constructed as a plug-in assembly detachable from the section 2 to facilitate access to the multiple springs of the switches 14 for adjustment, etc.

Positioned adjacent one of the corresponding ends of the cross bars 5 is a bar 15 of paramagnetic material and positioned adjacent one of the corresponding ends of the bars 6 is a similar transversely extending bar 16, the bars 15 and 16, hereinafter referred to as supply or connectors, being mounted on the base member 3 which may be provided with outwardly extending lugs or flanges 17 on which the bars are supported in spaced relation with respect to the ends of the cooperable bars 5 or 6, as the case may be, and forming channels or passageways 18 and 19 between the bars and the side walls 4. The bars 15 and 16 may be operatively connected by a paramagnetic member 20 completing the magnetic path and insuring maximum field strength between the armatures 7 and their associated cross bar 5. Positioned in the channels 18 and 19 are a plurality of generally rectangular-shaped members 21*u* and 21*t*, each being constructed of non-magnetic material and provided with a small rectangular-shaped insert 22 therein of paramagnetic material. As hereinafter described in detail, the members 21*u* and 21*t*, which for the purposes of identification may hereafter be referred to as keepers are movably mounted in their respective channels 18 and 19, such movement being at right angles to the connector bars 15 and 16, as the case may be, whereby the paramagnetic insert 22 may be operatively aligned with the particular supply bar and the adjacent end of the associated cross bar 5 or 6. To reduce the amount of travel of the members 21 the top and bottom corner portions of the bars 5 and 6, as viewed in Figs. 3 or 4, may be beveled as indicated at 23, the cross sectional shape of the insert 22 being substantially coextensive in size with the end face of the adjacent cross bars. Encircling each of the connector bars 15 and 16 is a solenoid winding 24, the latter being so wound and adapted to be connected to a source of current that the portions of the respective bars adjacent the ends of the cross bars 5 or 6 will be of opposite magnetic polarity when the windings are energized.

Assuming that the connecting bars 15 and 16 are magnetized with opposite polarity, it will be apparent that any of the cross bars 6 may be polarized by induction when the member 21*t* associated with such bar 6 is moved to bring the insert 22 thereof in alignment with the end of the bar, the magnetic lines of force passing from the supply or connector bar 16 through the insert 22 and bar 6. In like manner, movement of one of the members 21*u* associated with the supply or connector bar 15 to bring the insert 22 carried thereby into alignment with the adjacent end of the associated cross bar 5 will result in the flow of magnetic lines of force from the supply bar 15 through the associated insert and bar 5. Upon the magnetization of a cross bar 5 and a cross bar 6, the armature 7, operatively positioned at the intersection of the two bars energized, will be attracted to the energized bar 5, resulting in movement of the armature in opposition to the bias contact spring 13 and actuation of the contacts of the switch 14 associated therewith. Thus, by proper selection of one member 21*t* and one member 21*u*, any one of the armatures 7 may be actuated upon polarization of the supply or connector bars 15 and 16.

It will be appreciated by those skilled in the art that any one of a number of different impulse counting or other motor mechanisms may be employed to selectively move the keepers 21*t* and 21*u* from operative to inoperative position. Figs. 1, 2, 3 and 5 illustrate the invention utilizing counting relay structures indicated generally by the numerals 25*u* and 25*t*, the basic details of which are disclosed in the Bellamy patent heretofore referred to.

Briefly, each of the impulse counting relays 25*u* and 25*t* comprise a frame 26 which is illustrated as being provided with a mounting extension 27 suitably connected to the base 3, a winding 28 and a generally L-shaped pole piece 29, the arrangement being such that upon energization of the winding 28 the frame 26 and pole piece 29 will be magnetized with opposite magnetic polarity. Pivotally supported on the frame 26 by a pivot rod 32, is a plurality of L-shaped armatures 31, there being one more armature than the number of members 21*t* or 21*u* to be actuated by the particular relay. Referring to Figs. 1 and 3, it will be apparent that with the exception of the right hand armature 31 of the relay 25*t* and upper armature of the relay 25*u*, as viewed in Fig. 1, each successive armature is operatively connected to a successive keeper 21*t* or 21*u*, as the case may be.

The relays 25*t* and 25*u* are each provided with a plurality of restoring springs 33 and a plurality of operating springs 34, each restoring spring 34 being substantially in alignment with its associated armature and adapted to urge the latter in a clockwise direction as viewed in Fig. 3. It will be noted that, with the exception of the left-hand restoring spring 33, the remaining restoring springs are provided with offset terminal portions 35 which are adapted to bear on the next successive armature running from right to left as viewed in Fig. 2. The arrangement of the springs 33 and 34 is such that the force applied by the respective restoring springs 33 is greater than the magnetic attraction of the pole piece 29 on the armatures 31 when the latter are in their extreme outer position with respect to the pole piece as illustrated in Fig. 5. Further outward movement of each armature may be restrained by a suitable stop bar 36 of nonmagnetic material. It will be appreciated, however, that as the first armature, to-wit, the right-hand armature as viewed in Fig. 2, which hereafter will be referred to as the starting or initiating armature, does not have a restoring spring 33 bearing thereon, the first restoring spring being offset to engage the next armature, the operating spring 34 associated with the starting armature will urge the latter to a neutral or intermediate position as illustrated in Fig. 6. When an armature is in this position it will readily be attracted to the pole piece 29 upon the energization of the winding 28, drawing the armature to the position illustrated in Fig. 7, the pole piece retaining sufficient residual magnetism upon de-energization of the winding to retain the armature in its actuated position.

It will be apparent from a reference to Figs. 2 and 3, however, that as an armature is moved to the fully actuated position, the free end 31' of the armature will engage the restoring spring which is in alignment therewith, raising the same slightly, and the accompanying movement of the offset portion 35 thereof engaged with the succeeding armature will permit the latter to move under action of the operating spring 34 associated therewith to move such succeeding armature to the intermediate or neutral position, thereby bringing such armature sufficiently within the effective field of the pole piece 29 to cause movement of such armature to the pole piece upon the application of the next pulse to the winding. Thus upon the first pulse of the winding 28, the number one armature will be moved into engagement with the pole piece and the second armature moved to its intermediate position. Upon energization of the winding 28 by the next pulse the second armature will be attracted from its intermediate position. Upon energization of the winding by the following pulse the second armature will be attracted from its intermediate position to the fully actuated position in engagement with the pole piece 29 and the third armature permitted to move to its intermediate position, the action being successively repeated upon each additional impulse.

Referring to Figs. 1 and 2, it will be noted that each pulse counting mechanism 25*t* or 25*u* is provided with eleven armatures, the first or starting being independent of any of the keepers 21, while each successive armature which could be numbered, for example, from 1 to 10, is operatively connected and adapted to actuate a successive keeper 21*t* or 21*u*, as the case may be. Thus, upon the application of the initial impulse the starting armature will be fully actuated and the next or number 1 armature connected to the first keeper will be brought into its intermediate position, in which position, as illustrated in Fig. 6, the insert 22 carried by such keeper will operatively connect the associated connector bar with the cross bar 5 or 6 aligned with that particular keeper. Upon application of a second pulse to the winding, the number two armature and the like keeper will be brought into intermediate position, and the number one keeper moved to an inoperative position as illustrated in Fig. 7. Thus, for any given number of impulses from one to ten, the corresponding keeper will be placed in operative or connecting position relative to the supply or connector bar 15 or 16 and cross bar 5 or 6 associated therewith. As will be apparent to those skilled in the art, following actuation of both counting relays 25*u* and 25*t* to select any one of the respective ten keepers associated therewith, upon energization of the windings 24, the magnetic lines of force will operatively travel from their respective bars 15 and 16 through the insert 22 of the activated keeper of each relay and the cross bars associated therewith to activate and move the particular armature 7 associated with the selected pair of cross bars.

It will be noted that while I have illustrated the keepers 21 as having three positions, an upper and a lower inoperating position and an intermediate operative position, the utilization of other impulse counting structures may render it desirable to utilize a two-position operation of the keepers 21 comprising one inoperative position and one operative position. With the structure thus far described, omitting the switches 14, the entire actuating mechanism may comprise three actuating circuits, to-wit, each counting circuit and the magnetic energization circuit. Likewise, apart from the counting relay structures only twenty movable parts are employed other than the one hundred armatures 7. While I have illustrated the mechanism in connection with a one hundred armature structure, which of course would normally be utilized in the telephone industry, any number of bars 5 and 6, and armatures 7 could be employed to meet any particular requirement.

*General telephone circuits*

Figure 8:
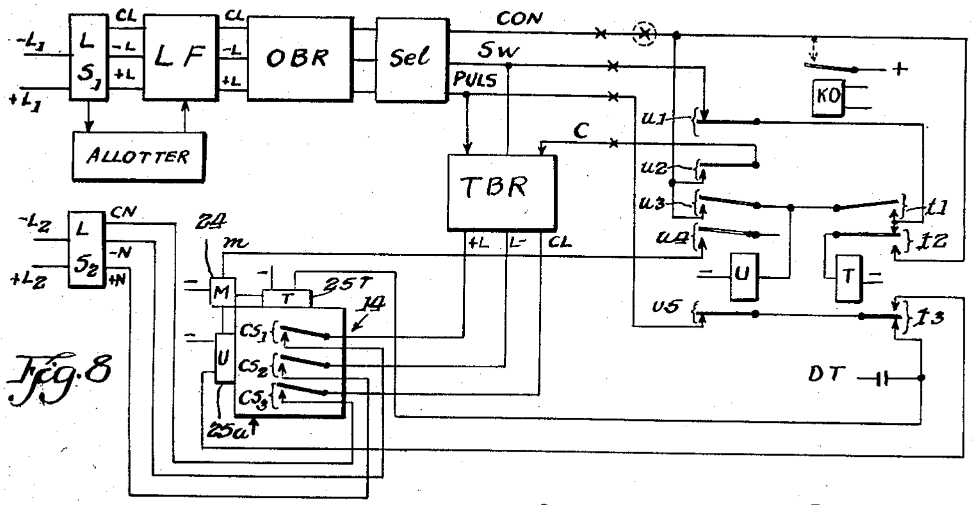
Fig. 8 is a block diagram of a phone circuit embodying the present invention.

The switch and actuating mechanism heretofore described is of particular use in automatic telephone circuits and Fig. 8 illustrates, in diagrammatic form, a circuit which may be employed in connection with such switch mechanism, the various components other than with respect to the switch and pulsing and switching relays associated therewith being illustrated in block form. While the switch mechanism illustrated in Figs. 1 to 7 may be utilized as a line finder, selector or connector, for the purposes of explanation, the switch will be described in a circuit utilizing the same as a connector, all line finders and selectors being indicated in block form.

Referring to Fig. 8, lines +L1 and −L1, respectively represent ground and battery sides of a calling line, and +L2 and −L2, respectively, represent ground and battery sides of a called line, such lines being operatively connected to line switches LS1 and LS2. The line switch LS1 is illustrated as being operatively connected to an allotter and a line finder LF which is operatively connected to an originating bridge relay circuit OBR and the latter to a selector Sel. These elements may be operatively connected in accordance with common telephone procedure and the general function of each will be apparent to those skilled in the art. The selector is illustrated in Fig. 8 as being operatively connected to a terminating bridge relay circuit TBR by three conductors, the conductors SW and PULS, respectively, designating the trunk conductors, while the conductor CON represents the control conductor which is operative to hold the circuits in operative relation until the call has been concluded. The switching mechanism 1, for example, may utilize a plurality of switches 14, only one of which is illustrated in Fig. 8, having three pair of contacts of the normally open type designated CS1, CS2 and CS3. One contact of each switch may be operatively connected to the outgoing lines +L, −L and CL of the terminating bridge TBR, the other stationary contacts being respectively connected to the line switch LS2 as indicated at +N, −N and CN. Obviously each of the other switches 14 may be similarly connected to the line switches of the other 'phone lines.

In accordance with general 'phone practice the connections from the calling line L1 to the calling line L2 and the sequence thereof may be as follows: upon operative connection of the line −L1 and +L1 by the lifting of the receiver of the 'phone associated therewith, line switch LS1 will be actuated and by means of the usual allotter and line finding circuits, a free line finder LF will be operatively connected to the calling line, the line finder being operative to find and connect the latter to the originating bridge relay OBR, hereinafter identified by the letters OBR. As hereinafter described in detail with respect to the originating bridge relay circuits, the latter may be operatively connected to a connector following the initial dialing pulses and thus to the terminating bridge relay. Following completion of the dialing pulses to set up the proper armature and switch 14 in the connector switch mechanism 1, the called line L2 will be operatively connected to the terminating bridge TBR through the line switch LS2 and connector 1. If the called line is busy, the terminating bridge relay will place a busy tone on the calling line, or if free, will place a ringing current on the called line. Upon answer of the called line, the latter will be operatively connected to the calling line for the transmission of the call and upon conclusion thereof the circuits will be restored to their original conditions.

As will be hereinafter described in detail, in connection with the originating bridge relay circuit, during dial operations the dialing pulses may appear on the pulsing conductor "PULS" illustrated in Fig. 8 as extending (for audio transmission) from the selector Sel to TBR, while switching pulses may appear on the conductor SW extending (for audio transmission) between the selectors Sel and TBR, such switching pulses appearing following the completion of a sequence of pulses designating one particular digit of the called number, with such pulses being operative to actuate relay circuits, either forming a part of or separable from the switch mechanism 1.

Fig. 8 illustrates the use of separate tens and unit relays under control of the dialing and switching pulses. The relay T, which will generally be referred to as the tens relay, may be provided with three sets of switch contacts numbered from 1 to 3, the contacts T1 being normally open, the contacts T2 being of single pole double-throw arrangement having a pair of stationary contacts and the single movable contact normally engaged with the upper contact and adapted to be engaged with the lower contact upon energization of the winding of the relay T. Contacts T3 are of similar arrangement. Relay U may be provided with five pairs of contacts U1 and U5 being normally closed and contacts U2, U3 and U4 being normally open.

Assuming that the calling line has been operatively connected to the relay T and the circuit is ready for dialing, the following condition exists with respect to the three lines CON, SW and PULS: the control conductor CON is open at contacts T2, the switching conductor SW is operatively connected to the winding of the relay T through the upper contacts T2, and the conductor PULS is operatively connected through closed contacts U5 and closed lower contact T3 with the winding of the impulse counter relay 25T, the opposite side of the latter running to minus or battery. Upon dialing, a pulse will appear on the pulsing conductor and thus to the counting relay 25T for each dial pulse produced, actuating the relay 25T to move the desired keeper 21 into operative intermediate position. Upon completion of such dialing sequence, a switching pulse will appear on the switching conductor SW which will travel through contacts U1 and T2 to the winding of the relay T, energizing the same, following which the armature of contacts T2 will be connected with the control conductor CON, locking relay T to control, the contacts T2 being of "make before break" construction. At the same time contacts T1 will close, transferring the switching conductor SW to the winding of relay U and through contacts T3 and will transfer the pulsing conductor to the units relay 25*u*. The next sequence of dialing pulses will travel through contacts U5 and contacts T3 to the impulse counting relay 25*u* to position the selected keeper 21*u* in operative position.

Upon completion of the second dialing sequence, a pulse will appear on the switching conductor which is now connected through contacts T1 to the winding U, resulting in actuation of the relay U. The arrangement of the contacts on the relay U is such that contacts U3 will make or close before contacts U1 open, thereby locking the relay U on control and breaking the circuit to switching. At the same time the contacts U5 will open, disconnecting the pulsing line. As contacts U2 close, the control conductor CON is operatively connected to the terminating bridge TBR, and as contacts U4 close ground is applied to the actuating winding 24 of the switching mechanism 1, resulting in magnetization of the bars 5 and 6 thereof and actuation of the selected armature 7 and associated switch 14. Upon the actuation of the selected switch 14, the terminating bridge TBR is operatively connected through the same to the line switch LS2 and the line —L2 and +L2 of the called party, at the same time contacts CS3 of switch 1 through line CN operatively connect the line switch LS2 to the terminating bridge relay TBR which, as hereinafter described, will test the line to determine whether it is busy, returning a busy tone to the calling party in the event the line is busy, and applying a ringing current to the called line in the event the latter is free, actuation of the line switch LS2, in the event the line is free, being operative to hold the line from any other calls.

Obviously, the line finder LF and selector Sel may utilize a similar switching arrangement which would generally function in the same manner as that above described, the line finder of course being a non-numerical switch.

*Modified switching mechanism*

The switching mechanism illustrated in Figs. 1 to 7 has thus far been described in connection with a telephone system utilizing a control circuit having individual tenths and unit relays for controlling the action of the switching mechanism during dialing operations.

Figure 9:
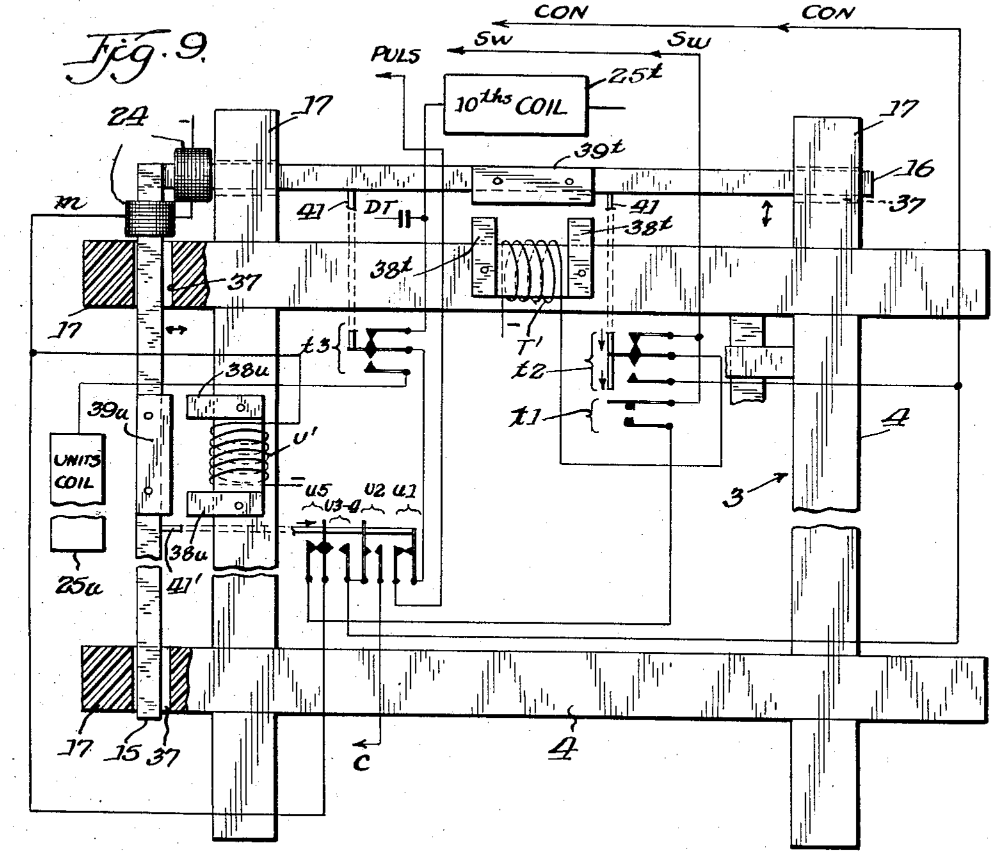
Fig. 9 is a semi-diagrammatical figure of a modified form of construction of my novel actuating mechanism.

Fig. 9 illustrates a modified form of switching mechanism which utilizes the same general construction and principles of operation as the construction illustrated in Figs. 1 to 7, but also includes switch contacts and actuating mechanism therefor which perform the functions of the independent tenth and unit relays T and U, respectively, illustrated in Fig. 8. This construction may utilize the same general cross bar and armature arrangement as that illustrated in Figs. 1 to 7 and the details thereof are therefore omitted from Fig. 9. Likewise, this construction may also utilize the pulse counting relays 25T and 25U which are illustrated merely in block form in Fig. 9.

Briefly, the operation of the modified construction illustrated in Fig. 9, as will be hereinafter described in detail, is similar to the construction previously described, with the exception that the supply or connector bars 15 and 16 are movable in the projections 17 of the base 3, the projections 17 being provided with slightly elongated slots 37 permitting the respective bars 15 and 16 to move laterally toward the adjacent ends of the cross bars 5 and 6.

Mounted on the base 3 are electromagnets T′ and U′, having respective pole pieces 38T and 38U cooperable with the pole pieces 39T and 39U, carried by the supply or connector pole bars 16 and 15, respectively, the electromagnets and their pole pieces being operable, upon energization thereof to move the associated supply or connector bar 15 or 16, as the case may be, inwardly toward the associated electromagnet. Suitably carried by the base 3, and illustrated in Fig. 9 in diagrammatic form only, is a series of contacts numbered T1, T2, and T3 and adapted to be actuated by members 41 carried by the bar 16 and adapted to actuate the switch contacts when the bar is moved inwardly following energization of the electromagnet T′, the sets of contacts T1, T2 and T3 generally corresponding to, and connected in substantially the same manner as the contacts $t_1$, $t_2$ and $t_3$ of the relay T illustrated in Fig. 8. In like manner, the base 3 may be provided with a plurality of sets of contacts associated with the bar 15 and adapted to be actuated by the latter through the member 41′, the sets of contacts being numbered U1, U2, U3, U4 and U5, and corresponding to, and connected in substantially the same manner as the sets of contacts *u*1 to *u*5, inclusive, or the relay U illustrated in Fig. 8. Thus, upon energization of the electromagnet T′, contacts T1 will transfer the switching conductor SW from the electromagnet T′ to the electromagnet U′, while the contacts T2, which are of the make-before-break type, will disconnect the electromagnet T′ from the conductor SW and connect it to control CON, while the contacts T3 will disconnect the conductor PULS from the tenth impulse counter 25T and connect it to the units impulse counter 25U.

Following completion of the next series of dialing pulses, and upon the application of the subsequent switching pulse, the electromagnet U′ will be energized moving the bar 15 to actuate the switch contacts associated therewith. The set of contacts U1 associated with the electromagnet U′ function, upon energization of the latter, to break the connection between the conductor PULS and the units impulse counter 25U; while the contacts U3—4 which are of a type to make before the contacts U5 break, will connect the electromagnet U′ to control CON, and as the magnets 24, operative to polarize the bars 15 and 16, are connected in parallel with the winding of the electromagnet U′, the winding 24 will be energized operatively polarizing the bars 15 and 16.

It will be appreciated from the above description that the construction illustrated in Fig. 9 functions in a manner similar to that illustrated in Fig. 8, with the exception that the functions of the relays U and T of Fig. 8 are performed by operative movement of the bars 15 and 16. This movement of the bars 15 and 16 also serves an additional function of locking the keepers 21*t* and 21*u* in their respective actuated positions, the arrangement being such that following actuation of the switch contacts associated with the respective bars, the bars will engage the respective keepers and operatively lock the same in place.

*Originating bridge relay circuits*

Figure 10:
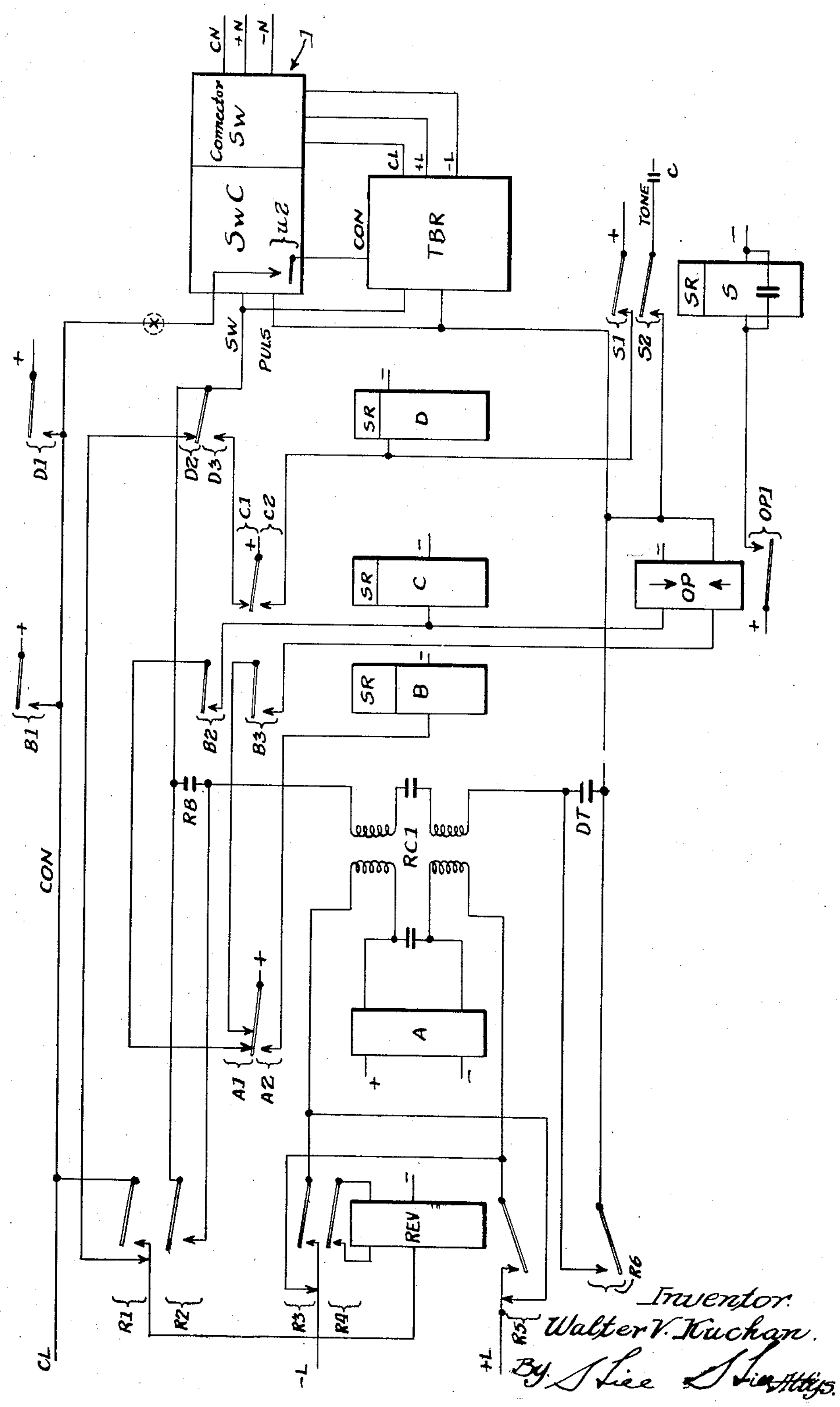
Fig. 10 is an enlarged detailed diagram of the originating bridge circuits, other cooperable circuits being shown in block form.

Fig. 10 illustrates, in diagrammatic form, the circuit of an originating bridge relay adapted to be utilized with the switching mechanism heretofore described, the originating bridge being shown in operative relation to a terminating bridge relay, a connector switch, and switch control circuits, all of which are illustrated in Fig. 10 in block form. To simplify the description, and at the same time illustrate the relationship between the various components, all details relating to line switches, line finders, allotters and selectors are omitted.

Briefly, the originating bridge illustrated in Fig. 10 may utilize four relays designated A, B, C and D, and a reversing relay REV which is operative after the called party has answered. As illustrated in Fig. 10, the relay A is provided with two sets of contacts, the relay B with three sets, the relay C with one set, the relay D with two sets and the relay REV with six sets, which contacts will hereinafter be identified by the numeral associated therewith preceded by the designation of the relay to which they belong, as for example: contacts A1 of relay A, contacts R6 of relay REV, etc.

As previously described in connection with Fig. 8, upon actuation of the calling line —L1 and +L1 by lifting the receiver, the line switch LS1 will be actuated, an allotter will set in operation a line finder which in turn will connect the calling line with the originating bridge relay circuit. Referring to Fig. 10, the line —L will be operatively connected through the normally closed contacts R3 with the lower primary winding of the repeating coil RC1, which is connected in series with one winding of the relay A, the opposite side of such winding being connected to battery or minus. In like manner, the line +L is operatively connected through the normally closed contacts R5 with the upper primary winding of the repeating coil RC1 which is in series with the upper winding of the relay A, the opposite end of which is connected to ground or plus. Actuation of the relay A will result in the closing of the normally open contacts A2 thereof, operatively connecting ground to the winding of the relay B, the opposite end of which is connected to battery. Upon the resulting energization of the relay B, which is of the slow release type, normally open contacts B1 thereof will lock control conductor CON to ground, thereby holding previously operated elements such as a line finder, line switch, etc. Likewise normally open contacts B2 will close, operatively connecting the winding of the relay C and one winding of an opposed wound relay OP to one of the upper stationary contacts A1 of the relay A, the opposite end of such opposed winding being connected to battery. In like manner, the contacts B3 operatively connect the other winding of the relay OP to the other stationary contact A1 of the relay A, the opposite side of such opposed winding being connected to the pulse conductor PULS extending to the terminating bridge relay circuit TBR and the switch control circuits SwC.

It might be mentioned at this point that while the diagram of Fig. 10 illustrates the conductors PULS and SW as extending from the originating bridge to the terminating bridge TBR, actual connection to the terminating bridge relay would not be consummated until the connector switch SW has been actuated following completion of the dialing operations. The initial dialing operation will then open the calling line —L and +L resulting in the de-energization of the relay A permitting the stationary contacts A1 to be operatively connected to ground resulting in actuation of the relay C through contacts B2, the relay B holding up as it is of a slow release type. At the same time, a pulse will be transmitted through the contacts B3 and winding of the opposed relay OP to the conductor PULS extending to the switch control SwC. Additional pulses if any of the first digit dialed will in like manner be transmitted to the switching control circuits as generally described heretofore in connection with Fig. 8.

It will be appreciated that at the first dialing pulse and energization thereby of the relay C, the normally open contacts C2 will be closed, operatively connecting ground to the relay D to actuate the latter, closing the contacts D3 thereof and connecting the conductor SW to the upper stationary contact C1 of the relay C. As the relays B, C and D are all of the slow release type they will hold up during dialing pulses corresponding to the dialed digit, but upon completion thereof, the interval between the dialing pulses of the next digit will be sufficiently long to permit the relay C to fall, it being remembered that the latter has been disconnected when the relay A is re-energized following the first series of dialing pulses, and upon the falling of the relay C, ground will be connected to the conductor SW through the contacts C1 and contacts D3; the relay D holding during such period due to its slow release construction, and consequently, a pulse will thus be placed on the conductor SW following which relay D falls, resulting in readying of the circuits for the next digit as has been heretofore described in connection with Fig. 8. At this point, relays A and B will be energized and C and D deenergized, and subsequent operations of the respective relays will be the same for the next digit, following which another pulse will be transmitted on the conductor SW resulting in actuation of the switching mechanism and closing of the conductor CON between the switching control SwC and the TBR, operatively connecting the latter to the originating bridge through the conductors SW and PULS.

As hereinafter set forth in connection with the terminating bridge relay circuits, following testing of the called line, and ringing in the event the line is clear, upon answer of the called party, a pulse will be sent back on the conductor SW which will be operatively connected through the contacts D2 of the relay D and contacts R1 of the relay REV to the winding of the latter. Upon energization of the reversing relay REV, the following connections will be made or broken as the case may be: contacts R1, which are of the make-before-break type, will lock the winding of the reversing relay REV to control CON and disconnect the winding from the conductor SW and contacts D2 of the relay D; normally open contacts R2 and R6, respectively, operatively connect the secondary of the repeating coil RC1 with the conductors SW and PULS extending to the terminating bridge TBR; contacts R3 and R5, both of which are of the make-before-break type, will operatively reverse the connections between the primary of the repeating coil RC1 and the calling line —L and +L; and contacts R4 will operatively close a tertiary winding on the reversing relay to provide a slow release characteristic thereto.

It will be particularly noted that when the reversing relay REV is actuated, all attachments are removed from the trunk whereby the secondary of the repeating coil RC1 is directly connected to the line SW and PULS running to the terminating bridge TBR, such direct connection being through the secondary of the repeating coil, and contacts R2 for the line SW, and secondary of the repeating coil, and contacts R6 for the line PULS.

As illustrated in Fig. 8, dial tone may be placed upon the calling line through a condenser connected to the lower stationary contact of the contacts T3, whereby the dial tone flows through the contacts T3 and U5 to the conductor PULS. As contacts R6 of the reversing relay REV are open prior to the completion of the call, the conductor PULS may be operatively connected to the repeating coil RC1, and thus to the calling line, through a condenser DT which may be used for busy tone transmittal. Similarly, when the called line has been tested and found clear and ringing current placed thereon, a ring-back signal may be transmitted on the line SW which is operatively connected to the upper secondary winding of the repeating coil through a condenser RB.

Opposed winding relay OP and pulse stretching relay S are operative to impart an audible tone signal to the called party in the event the calling party hangs up or the originating bridge otherwise releases. The specific operation of these circuits will be discussed in conjunction with the terminating bridge relay and circuits operative in the event the called party hangs up or the terminating bridge otherwise releases.

*Terminating bridge relay circuits*

Figure 11:
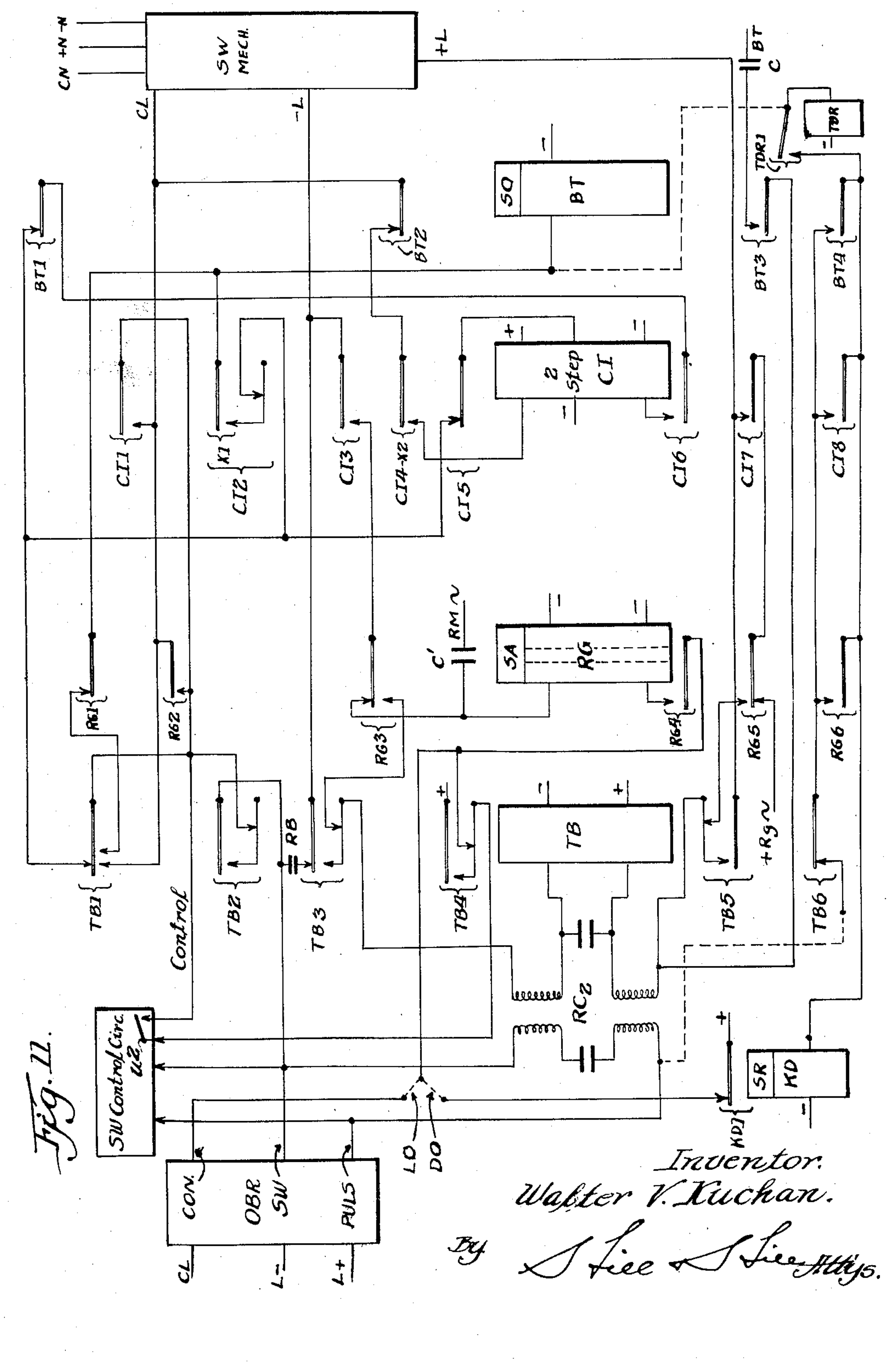
Fig. 11 is an enlarged detailed diagram of the terminating bridge circuits with other cooperable circuits shown in block form.

The terminating bridge relay circuits, as illustrated in Fig. 11 may generally utilize four relays, a terminating bridge relay TB, a ringing relay RG, a cut-in relay CI, and a busy-tone relay BT. In the particular embodiment of the invention illustrated, the relay TB is provided with six sets of contacts TB1 to TB6 inclusive, the ringing relay with six sets of contacts RG1 to RG6 inclusive, the cut-in relay with eight sets of contacts CI1 to CI8 inclusive, and the busy-tone relay with four sets of contacts BT1 to BT4 inclusive. The cut-in relay CI is illustrated as being of the two-step type in which contacts X1 of contacts CI2 and the contacts CI4, also designated as contacts X2 on the drawing will close on the first step of the relay CI while all other contacts of the relay will remain in the relationship illustrated in Fig. 11. Referring to the latter, it will be noted that the conductors PULS and SW from the originating bridge relay are operatively connected to a repeating coil RC2 while the control ground is received from the switch control circuit including the contacts *u*2 of the units relay illustrated in Fig. 8, or the contacts U2 of the switch assembly associated with the electromagnet U′ of the construction illustrated in Fig. 9. If the TBR is a local office bridge, control ground will be derived from the local OBR, control which will be carried forward to the switch control circuits as illustrated in Figs. 8 and 9. In the case of the OBR circuit illustrated in Fig. 10, such ground is maintained by the contacts B1 of the relay B. On the other hand, if the TBR is a distant office bridge, and thus operatively connected to the particular OBR by only a two-wire trunk control ground will be obtained from a local source, as for example, through the contacts KD1 of a knock-down relay KD illustrated in Fig. 11. In the latter figure, the dotted line L0 indicates the connection for local office operation, while the dotted line D0 indicates the connection for distant office operation.

Upon connection of the control conductor CON to ground through the switch control circuits, the following action will take place: ground is applied from OBR or relay KD, as the case may be through the normally closed contacts of TB4, U2 of the switch control circuits, upper contact of upper contacts TB1, and through contacts CI5 to the first-step winding of the cut-in relay CI, energizing the latter to actuate CI2 (X1), and CI4 (X2). Contacts X1 will operatively close the circuit from control to the winding of the busy-tone relay BT which is slow operating and will therefore not immediately actuate its contacts. Contacts X2 of the cut-in relay operatively connect one end of a winding of the relay CI, whose opposite end is connected to ground, to the line CL through the normally closed contacts BT2 of the busy-tone relay, which contacts remain closed until the busy-tone relay is fully actuated. As will be obvious from a reference to Fig. 8, the line CL is operatively connected through the switch mechanism through the line CN or control normal of the line switch of the called party, and if the called line is busy the control normal will be grounded, thus placing a ground on both sides of the associated winding of the cut-in relay which will therefore remain on the first step, permitting the busy-tone relay to ultimately actuate. At such time, the contacts BT1 of the busy-tone relay and the contacts BT2 thereof will open, the former opening the lock-in circuit to the cut-in relay through contacts CI6 thereof, and such relay will therefore remain on the first step, while opening of contacts BT2 disconnect the test winding associated therewith of the relay CI from the line CL. At the same time, contacts BT3 will close operatively connecting the busy tone through a condenser C to the repeating coil RC2, and back on the line to the OBR and the calling party.

In the event the called line is free, resistance battery will be returned from the line switch LS2 on the conductor CL through contacts BT2 and CI4 (X2), whereby the winding associated therewith of the cut-in relay will be actuated, resulting in contacts CI6 closing to energize the lock-in winding associated therewith, whereby the relay will pull to its second step and actuate the remaining contacts CI1, 3, 5, 6, 7 and 8.

The action of the cut-in relay when actuated to its second step is as follows: contacts CI5 will open the first-step winding of the relay, contacts CI1 will operatively connect the called normal CL to control (ground) holding the called line and preventing it from being seized by any other party; the contacts X1 will open operatively disconnecting the busy-tone relay before the latter can actuate its contacts; contacts CI3 will operatively connect the slow acting, ringing relay RG through normally closed contacts of RG3 to the called line —L, and ringing current will flow from the ringing machine indicated by the letters RM adjacent to ringing relay RG through the series condenser C′ out on the line —L, with the return being from +L, through the contacts CI7 of the cut-in relay and contacts RG5 of the ringing relay to +RG. It will be particularly noted that all ringing current may flow through the condenser C′ associated with the circuit rather than through the winding of the ringing relay RG enabling the use of any type of ring or tone signal, as desired.

In the event the party being rung answers, the winding of the ringing coil RG will be operatively connected from battery through the upper contacts RG3 and contacts CI3 to the line —L returning on the line +L through contacts CI7 and contacts RG5 to ground resulting in actuation of the ringing relay RG. It will be noted that the conductor SW from the originating bridge relay is operatively connected to the line —L through a condenser operatively connected to the line —L through a condenser operatively connected to the upper stationary contacts TB3 completing a ring-back circuit to the calling party. At this time, contacts RG1 connecting control (ground) through contacts TB1 with the busy-tone relay, will open, disconnecting the BT relay circuit. Likewise, contacts RG4 will lock the ringing relay RG to the control CON, and contacts RG3 will operatively connect the line —L with the upper secondary winding of the repeating coil RC2 through contacts TB3 and contacts CI3, and in like manner the line —L will be connected to the lower secondary winding of the repeating coil RC2 through contacts CI7 and contacts RG5 and TB5. Similarly contacts RG2 will lock the called normal CL to control (ground) through contacts $u2$, etc. Contacts RG3 and contacts RG5 when so actuated respectively disconnect the upper winding of the ringing coil and the circuit for the return of the ringing current and ground for the winding of the ringing coil. Upon connection of the line —L and +L to the relay TB the latter will be actuated, current flowing from the lower winding of the TB relay through the repeating coil through contacts TB5, RG5 and CI7, out on the line +L, back on the line —L, through CI3, RG3 and TB3, the other section of the repeating coil, and through the other winding of the relay TB. Actuation of the terminating bridge relay TB will result in the following actuation of the respective switches associated therewith: contacts TB1 will open the lock-in circuit from control through BT1 and CI6 to the CI relay resulting in the release of the cut-in relay CI, contacts TB2 which are of the make-before-break type will send a ground pulse back on switching conductor SW to the OBR for actuating the reversing relay REV, contacts TB3 will disconnect from the ring-back condenser and line SW and connect the line —L directly to the associated secondary winding of the repeating coil, at the same time opening circuit to RG3, and in like manner contacts TB5 will open the connection of line +L through the contacts RG5 and CI7, connecting the line +L directly to the associated section of the secondary of the repeating coil RC2; and contacts TB4 which are of make-before-break type will transfer control ground on all circuits, except the ringing coil RG to local ground associated with contacts TB4.

*Local office operation of originating and terminating bridge circuits*

Assuming that the originating and terminating bridge relays are in local offices, they will be connected by three lines: PULS, SW and CON, whereby the control ground is carried forward from the originating bridge relay to the terminating bridge relay as indicated in Figs. 8 and 11. With this arrangement, when the calling party hangs up the control will be opened to the ringing coil RG which will release, applying ground through contacts TB1, RG1 to the winding of the busy-tone relay BT which will ultimately actuate the relay, putting a tone signal on the line and indicating to the called party that the calling party has hung up. Upon the called party hanging up, relay TB will release disconnecting local ground through contacts TB4 and resulting in release of all relays and connector holding circuits, etc.

In the event the called party hangs up, the circuit is opened to the TB relay which will release disconnecting the terminating bridge relay from the called line, and as contacts TB1 close to place ground on the first step winding of the cut-in relay CI through the contacts CI5 thereof, resulting in actuation of the relay to the first step and closing of contacts X1 and X2 thereof. Closing of contacts X1 will operatively connect ground to the busy-tone relay winding, ultimately actuating the latter to place a busy tone on the line to the calling party through the contacts BT3 and RC2 of the coil. Upon receipt of such busy tone, the calling party will hang up, at which time the control ground will be opened from the originating bridge relay, permitting the entire terminating bridge to release. It will be appreciated from the above that the control is generally carried forward from the originating bridge relay to the terminating bridge.

*Distant office operation of the originating and terminating bridge circuits*

The general operation of the bridge circuits for distant office operation insofar as dialing and initial actuation of the bridge circuits to operatively connect the calling party with the called party are substantially the same. The main differences involve the disconnection of the bridge circuits when the called line is busy, no one answers, or after operative connection—one or the other party hangs up, and the manner in which the indication of the latter fact is given to the remaining party. As the originating bridge may be utilized in connection with either a local or distant office operation, while the terminating bridge will normally be set up for local or distant operation, the terminating bridge may eliminate certain elements for local operation which are included for distant office operation. Consequently, only one circuit is illustrated for the originating bridge which as previously mentioned, the terminating bridge is illustrated with alternate circuits for local office and distant office operation. As previously discussed, the arrangement of the originating and terminating bridges is such that the two wires trunk between the originating bridge and the terminating bridge is dry, to-wit, has no attachments connected thereon during audio transmission, the only currents are those associated therewith. Consequently the control ground cannot be readily carried forward to the distant office on a two wire transmission and simultaneously maintain the trunk therebetween dry. Provision is therefore made for controlling the control ground of the terminating bridge in the distant office by the called party following operative connection between the calling and called parties, and in the event the called party line is busy or does not answer, or the called party hangs up, the ground may be disconnected by means of a pulse transmitted from the originating bridge relay when the calling party hangs up. The additional circuits utilized to perform these functions are operatively connected to the circuits, illustrated in Fig. 11, heretofore described by dotted lines and include a slow releasing knock-down relay KD, a delay relay circuit associated therewith, contacts TB6 on the terminating bridge relay TB, contacts RG6 associated with the ringing relay RG, contacts CI8 associated with the cut-in relay CI and contacts BT4 associated with the busy tone relay BT. As the control ground in this case does not come from the originating bridge, the control lead CON from OBR, illustrated in Fig. 11, is omitted and the conductor from contacts TB4 and RG4 are connected, as indicated by dotted lines DO, to the contacts KD1 of the knock-down relay KD, the latter contacts being operative to normally connect the control to ground. The lead of the winding relay KD may be operatively connected to the pulsing conductor of the originating bridge relay circuit through any of the contacts RG6, CI8, or BT4, and the normally closed contacts TB6 which are indicated in Fig. 11 as being operatively connected to the conductor PULS by a dotted line. Likewise, as indicated in dotted lines, the winding of the relay KD is operatively connected to the winding of the busy-tone relay BT in series with a suitable delay unit or relay TDR which will delay operation of the relay KD for a predetermined period following energization of the winding and actuation of the busy-tone relay BT. Numerous types of suitable delay mechanisms are available, one for example being the commonly employed thermostatic-type delay relay.

Operation of these additional circuits are as follows: assuming that the called line is busy, as previously described, the relay CI will go to its first step, operatively grounding the busy-tone relay BT, and when the called line is tested and a ground found thereon, the relay CI will remain on its first step permitting the busy-tone relay to fully actuate, placing a busy tone on the line. Simultaneously with the grounding of the relay BT, the circuit from the latter to the delay unit, indicated in dotted lines in Fig. 11, is also grounded and after the required delay afforded by the delay unit, as for example ten seconds, the knock-down relay KD will actuate, opening the control ground and permitting the bridge to release. However, as contacts TB6 and BT4 would have been closed prior to actuation of the relay KD, in the event the calling party, following receipt of the busy-tone signal, hangs up before the relay KD is actuated, a knock-down pulse will be transmitted from the originating bridge OBR to the relay KD, such pulse appearing on the line PULS which is then operatively connected through contacts TB6 and BT4 to the relay KD.

Referring to Fig. 10, it will be apparent that such knock-down pulse results from opening of the relay A when the calling party hangs up, relay B temporarily holding due to its slow release characteristic, through contacts A1 and B3, and the associated winding of the opposed relay OP to the line PULS. In such case the duration of the pulse will approximately be the time required for the relay B to release following the release of the relay A.

In the event the called line is free, relay CI will be actuated to its second step to ring the called line and the relay BT will be rendered inoperative before it can actuate. If under such conditions, there is no answer, the bridge will be held until the calling party hangs up, the knock-down pulse from the originating bridge in such case being transmitted from the line PULS through closed contacts TB6 and CI8 to the relay KD, opening ground at KD1. In the event the called party answers, the relay TB will be actuated, which will open contacts TB6, operatively disconnecting the relay KD from the line PULS.

If under such conditions, the called party hangs up, relay TB will release, closing contacts TB6 and TB1, relay RG will hold as it is connected to ground through the contacts KD1 of the relay KD. The closing of contacts TB1 will result in actuation of the relay CI to the first step only, permitting the busy-tone relay BT to actuate, closing contacts BT3 to such a busy-tone signal back to the calling party. At the same time, the relay KD will be energized, after the predetermined delay provided by the delay unit TDR, thereby opening the control aid permitting the bridge to release. It will be appreciated that this feature eliminates any possibility of undue tie-up of the terminating bridge. If, following answer by the called party, the calling party hangs up the operation will be as follows:

As previously described in connection with the dialing operations in the originating bridge, it will be recalled that the two windings of the opposed winding relay OP are operatively connected to the ground through the contacts A1 of the A relay and contacts B2 and B3 of the B relay, inasmuch as the B relay is locked on A2 springs of the A relay will be energized as long as the calling party is on the line, so that upon hanging-up of the calling party, the relay A will release while the relay B, which is slow releasing, continues to hold. As the winding of the opposed relay OP associated with the contacts B2 is connected to battery, it will be energized at all times when a ground is applied from the contacts B2 and A1 while other winding of the relay OP connected to the contacts A1–B3 is operatively connected at its other end to the pulsing conductor which is operatively connected at the terminating bridge to contacts TB6, RG6, CI8, and BT4 running to the knock-down relay KD. As previously mentioned, if the called party has not answered, or the line is busy, the terminating bridge relay TB will be non-energized and the contacts TB6 will be closed, completing a circuit from the pulsing conductor to the winding of the knock-down relay KD through contacts RG6. If under these conditions, A is opened, ground will be applied to, and current will flow through, both windings of the opposed winding relay through contacts A1 and B2 and B3, whereby both windings will be energized as the winding connected to PULS will be in series with the winding of the knock-down relay KD. The two energized windings of relay OP will oppose and cancel one another so that the contacts OP1 will remain open, the transmitted pulse will energize the relay KD removing ground on CON of the terminating bridge and the latter will release. On the other hand, if the called party is on the line, the terminating bridge relay TB will be energized, resulting in the opening of the contacts TB6 and disconnection of the knock-down relay KD from the PULS conductor, and if in such case, the A relay is opened by the calling party hanging up, the winding of the opposed winding relay OP associated with the contacts B2 will be energized as current will flow therethrough, while the winding associated with the contacts B3 and PULS will not, as the latter winding will be open due to the opening of the contacts TB6 in the terminating bridge and no current will flow therethrough. This action will result in closing of the contacts OP1 of the relay OP and energization of the slow-releasing relay S which is provided with two sets of contacts S1 and S2, the contacts S1 operatively connecting ground to the winding of the relay D, while the contacts S2 may operatively connect the pulsing conductor with a suitable tone signal applied thereto, for example, through a condenser *c*. In this case, the tone signal will be applied until the slow-releasing relay S opens, providing an adequate signal to the called party that the calling party has hung up. As the contacts S1 maintain the relay D energized, and thus contacts D1 closed, ground will remain on control until the relay S falls.

Suitable means such as a shunt condenser, a slug, or both as illustrated in Fig. 10 may be utilized to provide desired delay characteristics in the release of the relay S and if for any reason any desired additional delay over that provided may be achieved by utilizing a thermo or other time-delay relay, as for example, one similar to the relay TDR illustrated in Fig. 11.

It will be appreciated from the above description in connection with the various circuits, that I have provided a novel arrangement wherein originating and terminating bridge circuits may be supplied by their respective batteries and in which all attachments may be removed from the line during audio transmission, whereby the trunk, irrespective of distance between offices is "dry." In the case of the illustrative bridge circuits shown in Figs. 8, 9, 10 and 11 during audio transmission, each side of the calling line is connected to the repeating coil RC1 through a single pair of contacts associated with the reversing relay REV, other switches, of course, in line finder circuits, etc., associated with the originating bridge being employed to connect the called line with the bridge circuit. Likewise, each side of the outgoing trunk of the originating bridge is connected to the repeating coil RC1 through a single pair of contacts associated with the reversing relay REV.

The same is also true of the terminating bridge, wherein each side of the incoming line is operatively connected to the repeating coil RC2 through a single pair of contacts associated with the relay TB, and any of the usual selector or connector switches which may be involved in connecting the terminating bridge to the incoming line. The outgoing line to the called party, in addition to any connector switches, etc., operatively connecting the terminating bridge with the called line, is operatively connected at each side thereof to the repeating coil RC2 by a single pair of contacts, also associated with the relay TB of the terminating bridge.

The systems illustrated are so arranged that the control of the system is carried ahead from the originating bridge and generally under the control of the latter, particularly with respect to testing of the called line, busy-tone return and disconnection of the bridge in the event of a busy line or failure to answer. However, in the event the calling party answers, the bridge circuits may be arranged to disassociate complete control of one bridge by the other bridge so that a party cannot hold any bridge other than his own in the event the other party is off the line. Thus, in the arrangement illustrated in Figs. 8 through 11, control is carried from the originating bridge to the terminating bridge in either a local or distance office, operation being under the control of the originating bridge until the called party answers, and if the line is busy or the party fails to answer, the originating bridge circuit will release the terminating bridge when the calling party hangs up. On the other hand, in the event the calling party answers, control of the terminating bridge is transferred to the called party, and in the event either party hangs up, the other party will be provided with a tone signal indicating such fact, and the bridge may thereafter be automatically released, making it available for other use and preventing the single party remaining on the line from holding any other bridge than his own.

It will also be apparent that I have provided a novel system wherein line polarity of the calling line may be reversed for supervisory purposes when the called party answers, this being accomplished in the embodiment of the invention illustrated through the contacts TB2 of the terminating bridge relay TB and the reversing relay associated with the originating bridge. The terminating bridge also includes a novel busy-tone circuit wherein a slow operating busy-tone relay may be employed which is operatively connected to initiate energization thereof at the time the terminating bridge is connected to the called line and during the period required for the busy-tone relay to actuate, the called line is operatively tested to determine whether it is free or busy. If free, the busy tone relay is then rendered inoperative before it can actuate, and ringing current is sent out on the line. If busy, activation of the relay BT is not restricted, permitting the latter to fully actuate and place a busy tone on the line to the calling party.

It will be appreciated from the above and the specific disclosures relating to the various points enumerated that the present invention provides a novel telephone circuit wherein a single pair of wires may be utilized for a considerable number of purposes, at the same time enabling the use of a "dry" trunk without attachments thereon during the audio transmission, such operations including dialing operations involving both pulsing and switching, transmission of busy tone and ring-back signals, disconnect functions from the originating bridge to the terminating bridge in the event the called party fails to answer, reversing of polarity of the calling line in the event the called party does answer and suitable signals to one party in the event the other party hangs up, thus eliminating the possibility of one party holding a bridge without knowledge that the other party is no longer on the line.

It is believed that while the present invention may be utilized with substantially any type of dial-operated systems, it will be of particular value in connection with toll dialing and national toll dialing systems.

As heretofore pointed out, the switching mechanism herein described, while specifically shown in Figure 8 as a connector, obviously may be utilized as a line finder, selector, or a director in systems wherein the numbering scheme is disassociated from the trunk scheme. It will be apparent, to those skilled in the art, that a switch mechanism embodying the present invention has many other possible applications which may or may not involve electrical switching operations, although in general the mechanism may be substituted in most cases wherever multiple switching structures are involved. It is believed that the switching mechanism is of particular application in central train control C.T.C. systems, as for example, in the remote operation of switches, signals, yard controls and the like, with its highly desirable advantages enabling relatively simple push button and dialing arrangements with interlocking safety features, etc. Other uses of the mechanism may include devices such as electric totalizers, automatic machine control systems and circuits, telemetering and computers, and also mechanically actuated devices that may not necessarily include electrical switches to be actuated by the switch mechanism. A typical example of an application of the latter type is in an enunciator system or the like wherein the armatures of the switch mechanism are associated with mechanical devices such as a visual drop member, etc., rather than an electrical switch structure.

It will also be appreciated that in some cases it may be desirable to manually actuate the keepers, as for example, by push buttons, whereby upon activation of any of one series of ten buttons, the associated tens keeper may be actuated; and upon actuation of any of a second series of ten buttons, the associated units keeper may be actuated, following which the polarizing winding may be re-energized and the selected armature actuated.

It will also be noted that while the construction illustrated in Fig. 9 discloses the actuated keeper as being clamped between the supply bar and adjacent end of the selected cross bar, contact between a supply bar, keeper and end of a selected cross bar could also be effected, as for example, by making the magnetic insert of each keeper of a wedge shape with the cooperative surface of the supply and cross bar ends being formed complementally thereto. In such construction, upon energization of the polarizing winding, the keeper may draw laterally into physical contact with both associated bars.

It will be particularly noted from the above-description that I have provided a novel selector mechanism which eliminates a considerable number of moving parts over prior devices, the particular embodiment of the invention illustrated utilizing merely two impulse-counting relay structures in connection with the individual armatures. Likewise, the invention lends itself to multiple arrangements whereby a plurality of selector mechanisms may be arranged in stacked series and the like, to occupy a minimum of space and at the same time being readily adaptable to interchangeable arrangements whereby one unit may be removed and the substitute unit inserted therefor, reducing maintenance and servicing problems to a minimum.

It will also be appreciated that more or less cross bars may be utilized for specific applications of the invention. For example, twenty cross bars instead of ten could be employed on each side to accommodate four hundred lines making an ideal line finder having from two to four times the capacity of present devices.

Having thus described my invention, it is obvious that various immaterial modifications may be made in the the same without departing from the spirit of my invention; hence, I do not wish to be understood as limiting myself to the exact form, construction, arrangement and combination of parts herein shown and described, or uses mentioned.

What I claim as new and desire to secure by Letters Patent is:

1. In a multiple actuating mechanism, the combination of a plurality of movable actuating elements of permeable material, arranged in a series of spaced rows with corresponding elements of such rows being laterally aligned with each other in a series of transversely extending rows, a permeable member for each of said rows, said members extending in the same direction as the rows with which they are associated and cooperable with the elements of their respective rows, the members of said transverse series being spaced from the members of the other series, common magnetically polarizing means for each series operative to oppositely polarize the respective series, and selecting means for each series operatively connecting the common polarizing means associated with such series and the members thereof whereby a selected member of the transverse series and a selected member of the other series may be oppositely polarized to actuate the permeable element associated with that particular pair of members.

2. In an actuating mechanism for switches and other devices, the combination of a plurality of paramagnetic elements arranged in a plurality of series with the elements of one series extending in directions transverse to the direction of a cooperable series, a plurality of paramagnetic armatures, each armature having one end operatively pivotally connected to an element of one series, and its opposite end operatively positioned adjacent to an element of another series, said armature and elements being so arranged that each armature is associted with a different pair of elements, a plurality of paramagnetic members each operatively associated with a corresponding end of each of the elements of a respective series, means for magnetically polarizing a pair of members associated with cooperable series of elements, whereby such members are of opposite polarity, and means movable between the respective members and the ends of adjacent elements for operatively connecting each of such members to one of the elements associated therewith, whereby the respective armature cooperable with such pair of elements is subjected to magnetic forces of opposite polarity to actuate the same.

3. In an actuating mechanism for switches and other devices, the combination of a plurality of paramagnetic elements arranged in a plurality of series with the elements of one series extending in directions transverse to the direction of a cooperable series, a plurality of paramagnetic armatures, each armature having one end operatively associated with an element of one series, and its opposite end operatively associated with the element of another series, said armature and elements being so arranged that each armature is associated with a different pair of elements, a plurality of paramagnetic members each operatively associated with all of the elements of a respective series, means for magnetically polarizing a pair of members associated with cooperable series of elements, whereby they are of opposite polarity, and means for operatively connecting each of such pair of members to one of the respective elements associated therewith, whereby the respective armature cooperable with such pair of elements is subjected to magnetic forces of opposite polarity to actuate the same.

4. In an actuating mechanism for switches and other devices, the combination of a plurality of paramagnetic elements arranged in a plurality of series with the elements of one series extending in directions transverse to the direction of a cooperable series, a plurality of paramagnetic armatures, each armature having one end operatively associated with an element of one series, and its opposite end operatively associated with the element of another series, said armature and elements being so arranged that each armature is associated with a different pair of elements, a plurality of paramagnetic members each operatively associated with a corresponding end of each of the elements of a respective series, means for magnetically polarizing the pair of members associated with cooperable series of elements, whereby such members are of opposite polarity, and a paramagnetic connector movable between the respective members and the ends of adjacent elements for operatively connecting each of such pair of members to one of the respective elements associated therewith, whereby the respective armature cooperable with such pair of elements is subjected to magnetic forces of opposite polarity to actuate the same, said members being movable toward and away from the ends of adjacent elements, operative to respectively clamp or release the associated connectors, and magnetic means for moving said members into clamping position.

5. In an actuating mechanism, the combination of a base structure of non-magnetic material, a plurality of cross bars of paramagnetic material arranged in two series, the bars of each series being arranged in respective spaced parallel planes, with the bars of each plane extending parallel to one another and the bars in one plane extending in a direction at right angles to the direction of the bars in the other plane, a plurality of armatures of paramagnetic material, each having one end operatively carried by one series of bars, the opposite end of each armature extending between a pair of cross bars of the other series, one end face of each cross bar being aligned with the corresponding end faces of the other cross bars of that series, a supply bar extending adjacent to the end faces of the respective series of cross bars, each supply bar extending at substantially right angles to such cross bars, means for polarizing said pair of supply bars of opposite magnetic polarity, a plurality of connector members, one for each cross bar, operatively positioned between the end face of each cross bar and the associated supply bar, each connector member having a portion of paramagnetic material operative to magnetically connect the supply bar and associated cross bar when said paramagnetic portion is interposed therebetween, impulse counting means associated with each series of cross bars and the movable connector members associated therewith, each impulse counting means being operatively connected to said connector members for operatively moving the latter in response to impulses received thereby, and means associated with said supply bars and adapted to be actuated following completion of the impulse counting means, whereby said supply bars are magnetically polarized of opposite polarity and the associated cross bars as determined by said impulse counting means are magnetized to actuate the armature associated with the selected pair of cross bars.

6. In an actuating mechanism as defined by claim 5, wherein said supply bars are movable toward and away from the adjacent ends of the cross bars associated therewith, means for operatively drawing said supply bars toward the adjacent ends of the associated cross bars operative to lock said movable connector members in position.

7. In an actuating mechanism, the combination of a base structure of non-magnetic material, a cooperable cover structure associated therewith, a plurality of cross bars of paramagnetic material arranged in two series, the bars of each series being arranged in respective spaced parallel planes, with the bars of each plane extending parallel to one another and the bars in one plane extending in a direction at right angles to the direction of the bars in the other plane, a plurality of armatures of paramagnetic material operatively carried by one series of bars, each of the latter bars having a plurality of transversely extending generally cylindrical grooves therein, each armature having an end portion shaped complementally to the respective grooves, with each of said end portions being positioned in one of said grooves whereby the armature is pivotally supported therein, the opposite end of each armature extending between a pair of cross bars of the other series, one end face of each cross bar being aligned with the corresponding end faces of the other cross bars of that series, such end faces of the respective cross bars being less in area than the cross sectional area of the intermediate portions of the respective cross bars, a supply bar extending adjacent to the end faces of the respective series of cross bars, each supply bar extending at substantially right angles to such cross bars, means for oppositely magnetically polarizing said pair of supply bars, a plurality of movable connector members, one for each cross bar, operatively positioned between the end face of each cross bar and the associated supply bar, each member having a portion of paramagnetic material operative to magnetically connect the supply bar and associated cross bar when said paramagnetic portion is interposed therebetween, impulse counting means associated with each series of cross bars and the movable members associated therewith, each impulse counting means being operatively connected to said members for operatively moving the latter into and out of connecting relation in response to impulses received thereby, an impulse circuit, means associated with said impulse counting means for switching the impulse circuit from one of said impulse counting means to the other of said impulse counting means following completion of a first series of impulses, means including an electro-magnet winding associated with said supply bars and adapted to be actuated following completion of the second impulse counting means for polarizing said supply bars and the associated cross bars as determined by said impulse counting means, whereby said magnetized cross bars are operable to actuate the armature associated therewith, and a plurality of switch contacts carried by said cover and operatively associated with the respective armatures for actuation thereby.

8. In an actuating mechanism as defined by claim 7, wherein said supply bars are movable toward and away from the adjacent ends of the cross bars associated therewith, means for operatively drawing said supply bars toward the adjacent ends of the associated cross bars operative to lock said movable connector members in position, and switching means associated with and actuatable by the respective supply bars for switching the impulse counting means during operation thereof.

9. In an actuating mechanism, the combination of a plurality of paramagnetic armatures, a plurality of paramagnetic elements associated with said armatures, each element being associated with a plurality of armatures, each of the latter being associated with a pair of elements and no two armatures being associated with the same pair of elements, a pair of impulse counting mechanisms, one of which is operatively related to one element of each pair of elements associated with the respective armatures, and the other of which is operatively related to the other elements of each pair, means cooperable with said impulse counting mechanism for magnetically polarizing an element selected by each counting mechanism, whereby said selected elements are of opposite polarity to actuate the armature associated with such pair of elements, and switching means operatively associated with said counting mechanisms for connecting first one and then the other of said mechanisms to a source of impulses.

10. A mechanism as defined in claim 9, wherein said switching means comprises relay means adapted to be controlled by suitable switching pulses, and includes means for actuating said magnetic polarizing means.

11. A mechanism as defined in claim 9, wherein said switching means forms a part of the actuating mechanism and is operable by movable elements forming a part of said magnetic polarizing means.

12. In an actuating mechanism, the combination of a plurality of paramagnetic armatures, a plurality of paramagnetic elements associated with said armatures, each element being associated with a plurality of armatures, each of the latter being associated with a pair of elements and no two armatures being associated with the same pair of elements, a pair of impulse counting mechanisms, one of which is operatively related to one element of each pair of elements associated with the respective armatures, and the other of which is operatively related to the other element of each pair, means including a pair of paramagnetic supply members and a plurality of movable paramagnetic connector members, cooperable with said impulse counting mechanism for magnetically polarizing an element selected by each counting mechanism, whereby said selected elements are of opposite polarity to actuate the armature associated with such pair of elements, and switching means operatively associated with said counting mechanisms for connecting first one and then the other of said mechanisms to a source of impulses.

13. A mechanism as defined in claim 12 wherein said switching means comprises relay means adapted to be controlled by predetermined switching pulses and is operative to control the magnetization of said supply bars.

14. A mechanism as defined in claim 12 wherein said supply bars are movable, and said switching means is operatively connected to and actuatable by movement of the respective bars, and magnetically actuatable means for operatively moving said bars in response to predetermined switching pulses.

References Cited in the file of this patent

UNITED STATES PATENTS

| | | |
|---|---|---|
| 2,331,514 | Stibitz | Oct. 12, 1943 |
| 2,430,316 | Voss | Nov. 4, 1947 |
| 2,452,568 | Harrison | Nov. 2, 1948 |
| 2,538,819 | Bellamy | Jan. 23, 1951 |
| 2,617,888 | Shepherd | Nov. 11, 1952 |
| 2,651,682 | Kruithof | Sept. 8, 1953 |
| 2,692,304 | Eilertson et al. | Oct. 19, 1954 |